(12) United States Patent
Millanta

(10) Patent No.: US 10,559,166 B2
(45) Date of Patent: Feb. 11, 2020

(54) DIGITAL CURRENCY IN A GAMING SYSTEM

(71) Applicant: Luke Millanta, Pyrmont (AU)

(72) Inventor: Luke Millanta, Pyrmont (AU)

( * ) Notice: Subject to any disclaimer, the term of this patent is extended or adjusted under 35 U.S.C. 154(b) by 0 days.

(21) Appl. No.: 15/485,228

(22) Filed: Apr. 12, 2017

(65) Prior Publication Data
US 2018/0114405 A1 Apr. 26, 2018

(30) Foreign Application Priority Data

Apr. 11, 2016 (AU) ................. 2016901331

(51) Int. Cl.
*G07F 17/32* (2006.01)
*G06Q 20/06* (2012.01)
*G06F 13/16* (2006.01)
*G07F 17/34* (2006.01)

(52) U.S. Cl.
CPC ...... *G07F 17/3248* (2013.01); *G06F 13/1668* (2013.01); *G06Q 20/065* (2013.01); *G07F 17/3213* (2013.01); *G07F 17/3227* (2013.01); *G07F 17/3241* (2013.01); *G07F 17/34* (2013.01)

(58) Field of Classification Search
None
See application file for complete search history.

(56) References Cited

U.S. PATENT DOCUMENTS

2013/0065669 A1* 3/2013 Michaelson ........ G07F 17/3225 463/25

\* cited by examiner

*Primary Examiner* — James S. McClellan
*Assistant Examiner* — Peter J Iannuzzi
(74) *Attorney, Agent, or Firm* — SoCal IP Legal Group LLP; Steven C. Sereboff

(57) ABSTRACT

There is disclosed a gaming machine. The gaming machine includes an electronic arrangement configured to receive digital currency data from an electronic device that is remote to the gaming machine. The digital currency data represents a store of value of a digital currency. The gaming machine further includes a data transfer arrangement configured to transfer the digital currency data via a data network to a data storage arrangement that is remote to the gaming machine. The gaming machine further includes a data recording arrangement configured to create record data representing a record of a unique attribute of the digital currency data.

3 Claims, 3 Drawing Sheets

DIGITAL CURRENCY IN A GAMING SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This application is based on and claims the benefit of priority from Australian Provisional Patent Application No. 2016901331, filed on Apr. 11, 2016, the content of which is incorporated herein by reference.

BACKGROUND

Field

This specification relates generally to the field of gaming and has particular, but by no means exclusive, application to electronic gaming machines (commonly referred to as "slot machines") operated by casinos.

Description of the Related Art

Slot machines allow players to wager on the outcome of a game of chance. The game of chance is typically depicted on a display as a number of spinning reels, each of which has an arrangement of various discrete symbols located on the outer periphery of the real. An outcome of the game of chance is brought about by causing all of the reels to commence spinning and then subsequently stopping the spinning reels to reveal a random combination of symbols that constitute an outcome of the game. For example, a player can wager a selectable number of credits and will be awarded a certain predefined number of credits if the outcome of the game of chance corresponds to a winning outcome; that is, a particular combination of winning symbols.

In today's casino environment, a player will typically insert conventional legal currency into a slot machine. The legal tender would be government issued bills or coins such as a $100 bill or 1 dollar coin. In response to inserting legal tender into a slot machine, the slot machine will issue the player with a certain number of credits that can be wagered on the game as previously described. For instance, the slot machine may be configured to issue the player with 100 credits in response to the player inserting $100 into the slot machine.

The vast majority, if not all, of today's slots machines are configured to only except traditional government issued currency. For example, slot machines in the US will only accept US government currency while the majority of slot machines in Europe will only accept the Euro.

In recent years, digital currencies have become more popular and have become widely accepted as an alternative to traditional government issued currency. While there are numerous digital currencies available, by far the most popular and well known is Bitcoin. A comprehensive explanation of Bitcoin is beyond the scope of this specification, but more details can be found here: www.bitcoin.org. Many digital currencies, and in particular Bitcoin, have made their way into a vast range of business transaction including cafes, bicycle stores, IT companies, car dealerships and the list goes on. Instead of using conventional government issued currency to purchase items, holders of digital currencies can use them to purchase products and services.

Given that digital currencies have made their way into mainstream commerce, there is now a need to allow people to use digital currencies such as Bitcoins as an alternative to government currencies when playing slot machines.

SUMMARY

In a particular embodiment, there is provided a gaming machine, the gaming machine comprising:
  an electronic arrangement configured to receive digital currency data from an electronic device that is remote to the gaming machine, the digital currency data representing a store of value of a digital currency;
  a data transfer arrangement configured to transfer the digital currency data via a data network to a data storage arrangement that is remote to the gaming machine; and
  a data recording arrangement configured to create record data representing a record of a unique attribute of the digital currency data.

The advantage of the gaming machine is that by cooperating with the remote data storage arrangement it facilitates the use of a central wallet for storing the digital currency. This allow for a simpler and more efficient rollout of digital currency in gaming systems because the central wallet avoids the need to augment each and every slot machine with its own wallet, which can be a very complex rollout for large casino that have several thousand slot machine on their gaming floors.

In a particular embodiment, there is provided an electronic system for use with a gaming machine that is remote to the electronic system, the electronic system comprising:
  a data receiving arrangement arranged to receive digital currency data from the gaming machine via a data network, the digital currency data representing a store of value of a digital currency;
  a data processing arrangement configured to process the digital currency data and generate value data; and
  a data transfer arrangement configured to transfer the value data to the gaming machine via the data network, the gaming machine being configured to process the value data and determine a number of credits to be made available for waging on the gaming machine.

An advantage of the electronic system is that it can act as a central wallet for all gaming machines, which as mentioned previously avoids the need to augment each individual machine with its own wallet for storing digital currency.

In a particular embodiment, there is provided a gaming machine, the gaming machine comprising:
  a user interface configured to allow a player to initiate a redemption of a digital currency;
  a data transfer arrangement configured to transfer redemption data, in response to the user initiating the redemption, via a data network to a data storage arrangement that is remote to the gaming machine, the data storage arrangement being configured to transfer digital currency data, via the data network, to the gaming machine in response to receiving and processing the redemption data, the digital currency data representing a store of value of a digital currency; and a redemption arrangement configured to process the digital currency data and allow the digital currency to be redeemed.

An advantage of this gaming machine is that it allows a player of a gaming machine to redeem unused credits in the form of digital currency instead of the usual legal tender.

In a particular embodiment, there is provided an electronic system for use with a gaming machine that is remote to the electronic system, the electronic system comprising:

a data receiving arrangement arranged to receive redemption data from the gaming machine via a data network;

a data processing arrangement configured to process the redemption data and generate digital currency data, the digital currency data representing a store of value of a digital currency; and a data transfer arrangement configured to transfer the digital currency data via the data network to the gaming machine, the gaming machine being configured to process the digital currency data and allow the digital currency to be redeemed.

An advantage of the electronic system is that it acts as a central wallet that can cooperate with remote gaming machines to permit players to redeem unused credits as digital currency.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
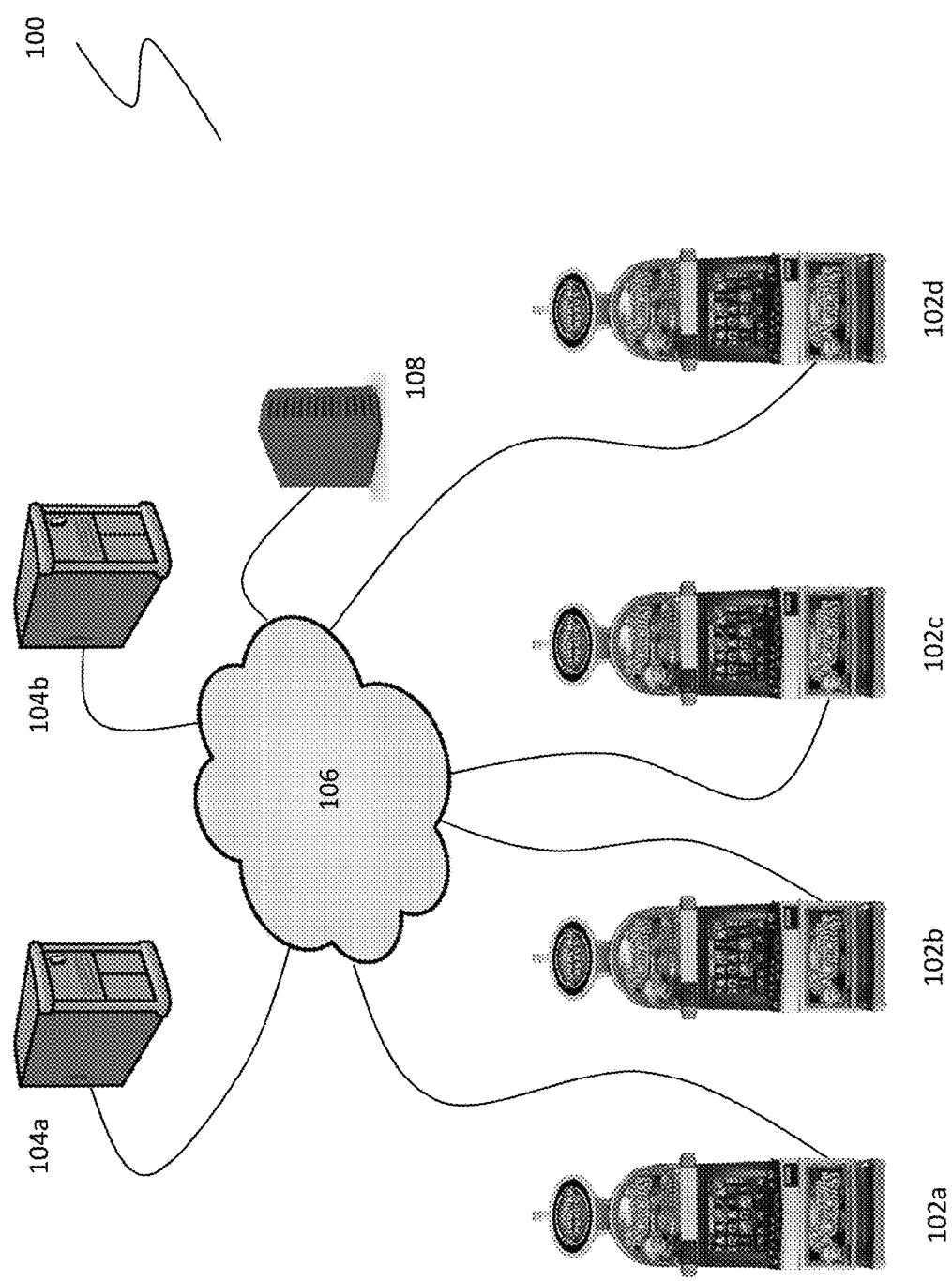
FIG. 1 illustrates an embodiment of a casino gaming system.

The gaming system 100 illustrated in FIG. 1 is representative of a system that can be used in gaming establishments such as casinos. The gaming system 100 comprises several key elements including numerous slots machines 102a to 102d, a casino management system (cms) 104a and 104b, a data network 106, and a transfer server 108.

In relation to the slot machines 102a to 102d, these are typical of slot machines manufactured and distributed by gaming companies such as International Game Technology (IGT) and Scientific Games. The slot machines 102a to 102d are typically arranged to offer patrons of the casino the ability to stake a wager on the outcome of a spinning reel game of chance. While this particular embodiment of the system 100 is described in the context of traditional slot machines, it is envisaged that in alternative embodiments different types of gambling machines can be incorporated. For example, alternative embodiments can include a mixture of conventional slot machines and other gambling machines such as video poker and/or bingo machines. The system 100 is only described in the context of traditional slot machines for simplicity.

The casino management system 104a and 104b is typical of casino systems made available by gaming companies such as International Game Technology and Scientific Games. The casino management system 104a and 104b is operated by a casino and allows the casino to perform a range of operational function in conjunction with the slot machines 102a to 102d. For example, the casino management system 104a and 104b would perform all key accounting functions in relation to all money put through and paid out by the slot machines 102a to 102d. The casino management system 104a and 104b can also provide a range of other functionality such as providing promotional and bonus content to the slot machines 102a to 102d. Other functions that may be offered by the casino management system 104a and 104b is cashless (ticket in/ticket out) functionality and player card (loyalty) operations. As described in subsequent paragraphs of this description, the casino management system 104a and 104b has a unique function in relation to managing a digital currency.

The transfer server 108 is a unique server and a detailed description of its functions are provided in subsequent paragraphs of this description. However, the high-level purpose of the transfer server 108 is to initiate a transfer of digital currency that may reside in any of the slot machines 102a to 102d to the casino management system 104a and 104b.

The data network 106 is a data network that allows the slot machines 102a to 102d, the casino management system 104a and 104b and the transfer server 108 to exchange data with each other as required. The data network 106 is in the form of a high-speed Ethernet based network. As such, the slot machines 102a to 102d, casino management sever 104a and 104b and transfer server 108 are all coupled to the data network 106 via appropriate Ethernet interfaces. While the data network 106 is described as being an Ethernet based network it is envisaged that other suitable networking technologies could be employed in alternative embodiments. An example of an alternative networking technology is WiFi.

As described previously, the system 100 includes certain functionality to support digital currency. More specifically, what makes the gaming system 100 unique over prior art gaming systems is that it allows users of the slot machines 102a to 102d to wager based on digital currency. In this particular gaming system 100 a user of any of the slot machines 102a to 102d can "insert" Bitcoins into a slot machine 102a to 102d in the same way a user can insert traditional government issued currency such as US dollars. It is envisaged that alternative embodiments digital currencies other than Bitcoin can be used with the slot machines 102a to 102d. Alternative digital currencies can include, for example, Zerocoin, Primecoin and Litecoin. In addition to accepting digital currency in the form of Bitcoins, the slot machines 102a to 102d will also accept traditional government issued currency therefor allowing the slot machines 102a to 102d to accept both government currency and digital currency.

With the ever increasing popularity and widespread commercial acceptance of digital currencies, the gaming system's 100 support of digital currencies is to allow patrons of a casino to engage in gambling activities in much the same way that patrons currently gamble using government currencies. The following describes how the gaming system 100 enables patrons to gamble with the digital currency, Bitcoin.

The first thing to note about the system 100 is that to enable wagering on the slot machines 102a to 102d using digital currency is that the slot machines 102a to 102d are arranged to allow a player to 'insert' their digital currency. To do this it is not possible to use existing bill acceptors—instead each slot machine 102a to 102d has a specific input arrangement for allowing players to insert their digital currency. In the case of digital currency in the form of Bitcoins each of the slot machines 102a to 102d are equipped with a USB port. By having USB ports on the slot machines 102a to 102d a player can safely store their Bitcoins on a USB stick (or other USB data storage device) and carry that USB stick to a casino. To load Bitcoins into a slot machine 102a to 102d for gambling a player inserts their USB stick (loaded with Bitcoins) into a slot machine 102a to 102d (step 210 of FIG. 2). Subsequent to detecting the insertion of the USB stick, the slot machine 102a to 102d transfers the Bitcoins on the USB stick into secure memory in the slot machine 102a to 102d (step 212 of FIG. 2).

Figure 2:
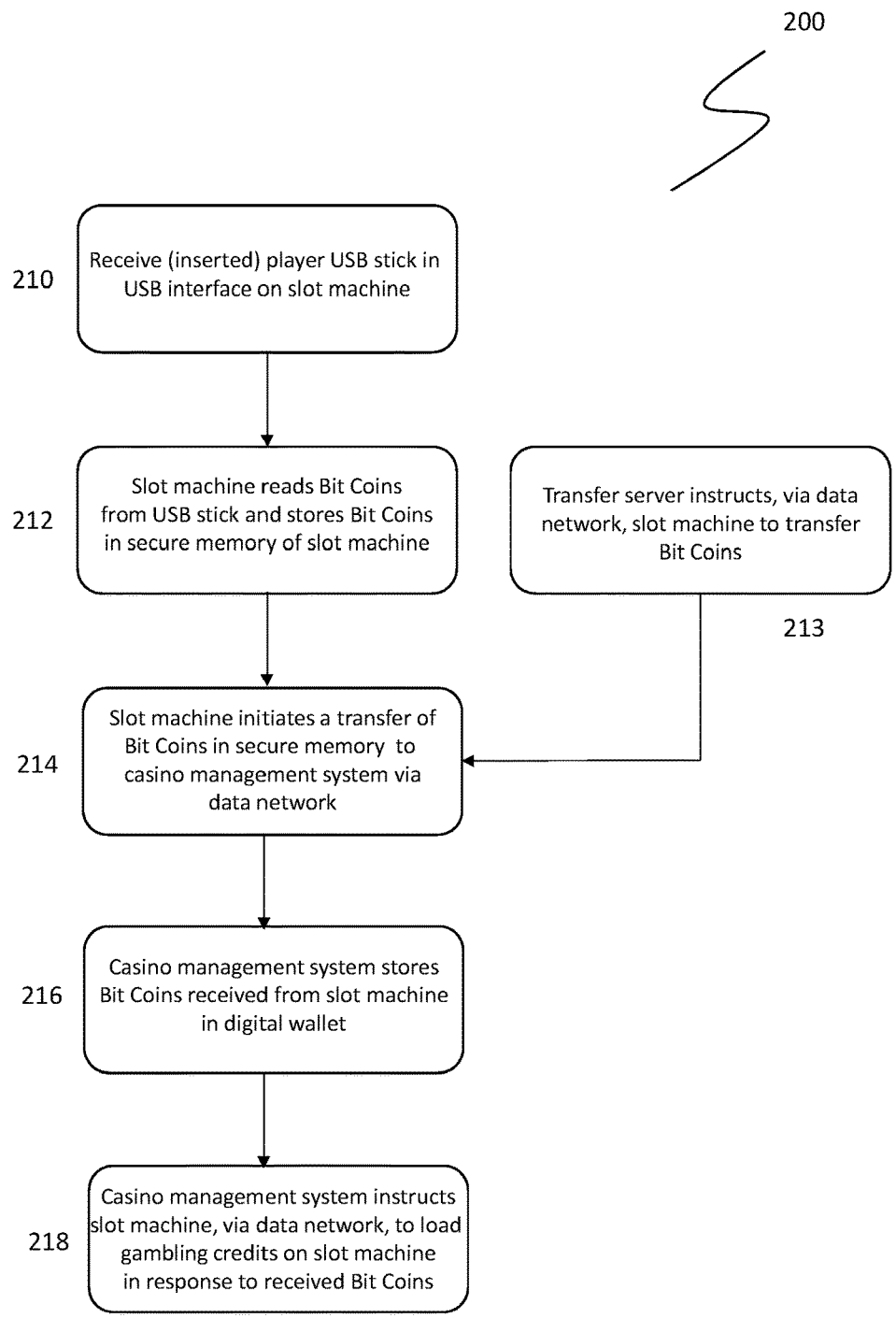
FIG. 2 is a shows various steps performed by the embodiment of the casino gaming system of FIG. 1.

Once the slot machine 102a to 102d has transferred the Bitcoins from the USB stick into its internal secure memory, the slot machine 102a to 102d proceeds to transfer the Bitcoins to the casino's central digital currency wallet (step 214 of FIG. 2). In relation to the casino's central digital currency wallet, the casino management system 104a and 104b is augmented with a secure storage facility (such as a RAID) for securely storing Bitcoins received from the slot machines 102a to 102d. To transfer Bitcoins from slot machines 102a to 102d to the casino management system 104a and 104b, the slot machine 102a to 102d initiates a transfer of the Bitcoins by sending data (representing the Bitcoins) via the data network 106 to the casino management system 104a and 104b. On receiving the data that represents the Bitcoins the casino management system 104a and 104b stores the Bitcoins in the central currency wallet (step 216 of FIG. 2).

Once the Bitcoins have been transferred between the slot machines 102a to 102d and the casino management system 104a and 104b (as described above), the casino management system 104a to 104b instructs the relevant slot machine 102a to 102d to put the relevant number of credits on the slot machine 102a to 102d (step 218 of FIG. 2). This process of the casino management system 104a to 104d applying credits to the slot machine 102a to 102d is essentially the same process that is currently employed for existing cashless gaming such as that based on ticket-in-ticket-out. Once the credits have been applied to the slot machine 102a to 102d the player is free to play the slot machine 102a to 102d as normal.

As noted earlier, the system 100 comprises a transfer server 108. The server 108 is capable of initiating a transfer of Bitcoins from the slot machines 102a to 102d to the casino management server 104a and 104b. In the previously described example of transferring Bitcoins from the slot machines 102a to 102d to the casino management system 104a and 104b the transfer was initiated by the slot machine 102a to 102d, however it is possible that the initiation of the Bitcoin transfer is performed by the transfer server 108 and not the slot machines 102a to 102d. In this scenario, the transfer server 108 will interact with the slot machines 102a to 102d to cause the slot machines 102a to 102d to transfer bit coins to the casino management server 104a to 104b via the data network 106 (step 213 of FIG. 2).

Because the slot machines 102a to 102d are designed to operate in licensed gaming venues it is mandatory that the slot machines 102a to 102d and the casino management server 104a and 104b cooperate to maintain detailed records of all money wagered and paid out (prizes) for auditing purposes. In this regard, the slot machines 102a to 102d and the casino management system 104a and 104b maintain detailed records of any Bitcoins inserted and wagered on the slot machines 102a to 102d.

Figure 3:
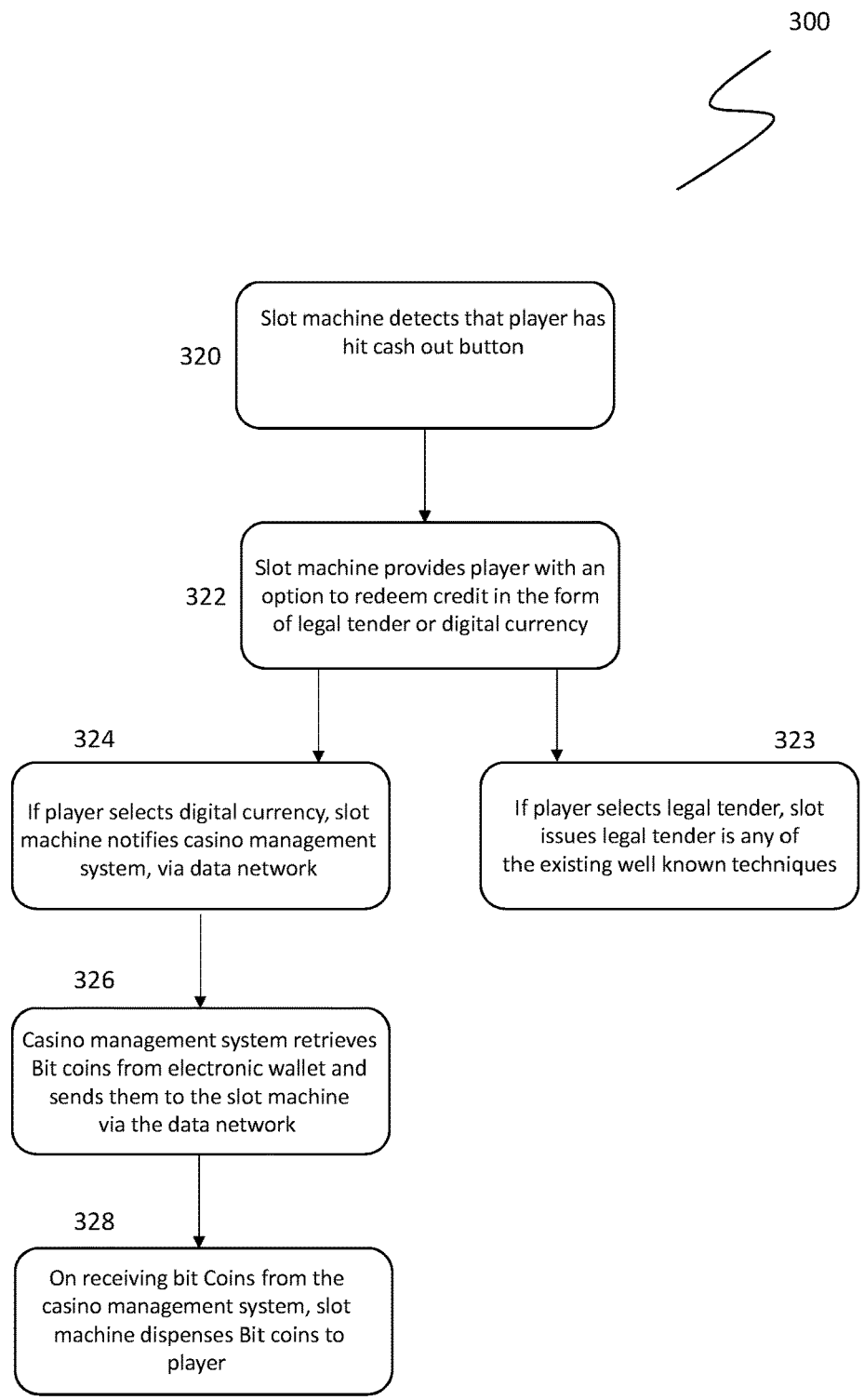
FIG. 3 shows various steps performed by the embodiment of the casino gaming system of FIG. 1.

The system 100 is also arranged to allow players of the slot machines 102a to 102d to 'cash out' in Bitcoins. To do this the player of a slot machine 102a to 102d hits the cashout button on the slot machine 102a to 102d (step 320 of FIG. 3). In response to this the slot machine 102a to 102d first gives the player an option to redeem their unplayed credit in the form of normal legal tender or digital currency (step 322 of FIG. 3). This option is presented to the player by displaying a selection menu on the screen of the slot machine 102a to 102d. By touching the relevant section of the slot machine 102a to 102d screen the player can make their selection of whether they want to receive the unused credit in normal legal tender or digital currency. If the player elects to receive unused credit in normal legal tender then the slot machines 102a to 102d issue the legal tender in the regular well known techniques (step 323 of FIG. 3). In the event the player of the slot machine 102a to 102d opts to take their unused credits in digital currency the next thing the slot machine 102a to 102d does is to notify the casino management system 104a and 104b that the player wants to redeem digital currency (step 324 of FIG. 3). In response to this the casino management system 104a and 104b retrieves the appropriate number of Bitcoins from its central wallet and sends them as data (representing the Bitcoins) via the data network 106 to the slot machines 102a to 102d (step 326 of FIG. 3). Subsequent to receiving the Bitcoins from the casino management system 104 the slot machine 102a to 102d then proceeds to dispense the Bitcoins to the player (step 328 of FIG. 3).

To facilitate the dispensing of Bitcoins to the player, the player must have inserted their USB stick into the slot machine 102a to 102d (as previously described). When inserted, the slot machine 102a to 102d transfers the relevant Bitcoins to the player's USB stick via the USB port. At this point the player can remove their USB stick from the USB port of the slot machines 102 and is free to take with them their redeemed Bitcoins.

It is claimed:

1. A gaming system consisting of:
  a casino management system, a plurality of gaming machines, a transfer server and a local area network which interconnects the casino management system, the gaming machines and the transfer server;
  each gaming machine comprising a user interface and an input arrangement configured to receive a portable storage device carrying digital currency data, the digital currency data being transferrable to and from the casino management system via the local area network upon receipt of the portable storage device at the input arrangement;
  the casino management system comprising a data processing system for managing the gaming machines, including performing accounting functions and maintaining a record of all digital currency put through and paid out by the gaming machines, the casino management system further comprising:
    a data transfer arrangement configured to transfer the digital currency data to and from a selected one of the gaming machines via the local area network and under control of the transfer server; and
    a secure storage facility having a central digital currency wallet adapted to store the digital currency data transferred from the input arrangement of the selected one of the gaming machines, the data processing system being operable to:

assign a credit value of the digital currency data to the selected one of the gaming machines via the local area network and under control of the transfer server, and assign a value of unused credits in the form of digital currency upon a redemption request being made at the user interface of the selected one of the gaming machines, the redeemed digital currency data being transferrable to the portable storage device received at the input arrangement via the local area network and under control of the transfer server; and the transfer server comprising a data processing system for controlling transfers of digital currency data upon receipt of the portable storage devices at the input arrangements of the gaming machines to and from the casino management system, the transfer server including an interface for sending a transfer request via the local area network to a one of the gaming machines having received digital currency data, wherein the transfer request is arranged to initiate a transfer of the received digital currency data to the central currency wallet of the casino management system.

2. The gaming system of claim 1 wherein the digital currency data is in the form of Bitcoin.

3. The gaming system of claim 1 wherein the portable storage device is a USB data storage device.

\* \* \* \* \*